(12) United States Patent
Ide

(10) Patent No.: US 8,305,675 B2
(45) Date of Patent: Nov. 6, 2012

(54) LIGHT CONTROL APPARATUS

(75) Inventor: Takayuki Ide, Fussa (JP)

(73) Assignee: Olympus Corporation, Tokyo (JP)

( * ) Notice: Subject to any disclaimer, the term of this patent is extended or adjusted under 35 U.S.C. 154(b) by 519 days.

(21) Appl. No.: 12/686,540

(22) Filed: Jan. 13, 2010

(65) Prior Publication Data

US 2010/0181463 A1 Jul. 22, 2010

(30) Foreign Application Priority Data

Jan. 16, 2009 (JP) ................................ 2009-007349

(51) Int. Cl.
G02B 26/02 (2006.01)

(52) U.S. Cl. .......................... 359/230; 359/234; 396/510

(58) Field of Classification Search .................. 359/227, 359/230, 232–236; 396/493–497, 510
See application file for complete search history.

(56) References Cited

U.S. PATENT DOCUMENTS 7,085,032 B2 * 8/2006 Sato .............................. 359/230
7,699,549 B2 * 4/2010 Dochi et al. ............... 400/208.1

FOREIGN PATENT DOCUMENTS

JP 2006-330314 12/2006

* cited by examiner

Primary Examiner — James Phan
(74) Attorney, Agent, or Firm — Scully, Scott, Murphy & Presser, PC

(57) ABSTRACT

A light control apparatus for controlling incident light passing through an aperture includes a substrate having the aperture, a plurality of incident light control members that are moved respectively in different planes perpendicular to an optical axis direction on the substrate, a plurality of drive members that drive the incident light control members, and separating members that separate, with a certain gap, moving spaces in which the plurality of incident light control members moves in the respective planes. The plurality of incident light control members are each moved by the drive members between an aperture position and a retracted position away from the aperture position.

13 Claims, 11 Drawing Sheets

LIGHT CONTROL APPARATUS

CROSS-REFERENCE TO RELATED APPLICATION

The present application is based upon and claims the benefit of priority from the prior Japanese Patent Application No. 2009-007349 filed on Jan. 16, 2009; the entire contents of which are incorporated herein by reference.

BACKGROUND OF THE INVENTION

1. Field of the Invention

The present invention relates a light control apparatus that controls incident light passing through an aperture.

2. Description of the Related Art

Various types of variable optical apparatuses have been conventionally used. Among them is an insertion type variable optical apparatus in which one or plurality of optical elements are moved into and out of the optical path by an electromagnetic drive source or other drive source to change the optical characteristics of the incident light passing through the optical path. The functions of this insertion type variable optical apparatus can be extended by providing a plurality of optical elements.

With improvements in the image quality of portable devices having an image pickup function and small-size optical apparatuses such as micro videoscopes in recent years, there are demands for improvements of the optical components such as lenses, stops and optical filters used therein. Specifically, there are increasing demands for replacement of conventional fixed focal length lenses, fixed aperture stops, and optical filters having fixed characteristics respectively with adjustable focus lenses, variable diaphragm apparatuses, and optical filters having variable characteristics. The above-described insertion type variable optical apparatus is focused on as an optical apparatus suitable for use in small-size optical apparatuses described above, because the insertion type variable optical apparatus can easily be made small for its simple structure. Japanese Patent Application Laid-Open No. 2006-330314 discloses such an insertion type variable optical apparatus that can easily be made small. The apparatus disclosed in this patent document comprises a plurality of light blocking members that control the quantity of light, a plurality of driving means for respectively driving the plurality of light blocking members by an electromagnetic driving force generated by a magnetic circuit, and a base member on which the light blocking members and the driving means are mounted. In this apparatus, a member that prevents the entrance of leakage flux is provided in between the drive means, whereby a reduction in the size of the apparatus and stable driving are achieved.

Nowadays, a reduction in the size of the apparatus is required. With a reduction in the size of the apparatus, a frictional force tends to be a detrimental factor that prevents stable operation of the apparatus, and the influences of the frictional force can be a dominant detrimental factor.

In the apparatus disclosed in Japanese Patent Application Laid-Open No. 2006-330314, the plurality of light blocking members are in contact with each other as they rotate. Therefore, the operation of one light blocking member may affect the operation of another light blocking member, which may lead to a malfunction of the apparatus.

The present invention has been made in view of the above situations and has an object to provide a light control apparatus having excellent operational performance.

SUMMARY OF THE INVENTION

A light control apparatus for controlling incident light passing through an aperture according to the present invention comprises a substrate having the aperture, a plurality of incident light control members that are moved respectively in different planes perpendicular to an optical axis direction on the substrate, a plurality of drive members that drive the incident light control members, and separating members that separate, with a certain gap, moving spaces in which the plurality of incident light control members moves in the respective planes, wherein the plurality of incident light control members are each moved by the drive members between an aperture position and a retracted position away from the aperture position.

According to a preferred mode of the present invention, it is desirable that the thickness of the separating member along the optical axis direction be larger than the thickness of the incident light control members along the optical axis direction.

According to a preferred mode of the present invention, it is desirable that the separating member for one of the incident light control members comprise a first separating member and a second separating member.

According to a preferred mode of the present invention, it is desirable that the second separating member has a rail-like shape and be provided on the substrate.

According to a preferred mode of the present invention, it is desirable that the apparatus further comprise a second substrate opposed to the substrate, and the second separating member having a rail-like shape be provided on each of the substrate and the second substrate.

According to a preferred mode of the present invention, it is desirable that each of the light control members comprise a light control portion and an arm portion, the arm portion have a rotary shaft, and the light control portion be swung about the rotary shaft to move between the aperture position and the retracted position away from the aperture position.

According to a preferred mode of the present invention, it is desirable that the light control portions of the incident light control members have apertures having different sizes respectively and regulate the quantity of incident light passing through the apertures.

According to a preferred mode of the present invention, it is desirable that the apparatus satisfy the following conditions:

$$l1 > l2 > \ldots > ln, \text{ and}$$

$$L1 > L2 > \ldots > Ln,$$

where n is the number of the incident light control members, L1 to Ln are diameters of the light control portions of the first to n-th incident light control members respectively, and l1 to ln are diameters of the apertures of the light control portions of the first to n-th incident light control members respectively.

According to a preferred mode of the present invention, it is desirable that the first to (n−1)-th incident light control members move from the retracted position to the aperture position synchronously, in response to a movement of the n-th incident light control member from the retracted position to the aperture position.

According to a preferred mode of the present invention, it is desirable that positioning portions be provided on the incident light control members, and when the n-th incident light control member is moved to the aperture position, the n-th incident light control member abut the positioning portion provided on the (n−1)-th incident light control member, whereby positioning of the n-th incident light control member is achieved.

According to a preferred mode of the present invention, it is desirable that distances between the rotary shafts provided on the respective incident light control members and the optical axis be substantially equal to each other.

According to a preferred mode of the present invention, it is desirable that distances between the rotary shafts provided on the respective incident light control members and the optical axis be different from each other.

According to a preferred mode of the present invention, it is desirable that the apparatus satisfy the following condition:

$$R1 > R2 > \ldots > Rn,$$

where R1 to Rn are distances between the center of the aperture and the rotary shaft of the first to n-th incident light control members respectively.

DETAILED DESCRIPTION OF THE INVENTION

In the following, embodiments of the light control apparatus according to the present invention will be described in detail with reference to the accompanying drawings. It should be understood that the present invention is not limited to the embodiments.

(First Embodiment)

Figure 1:
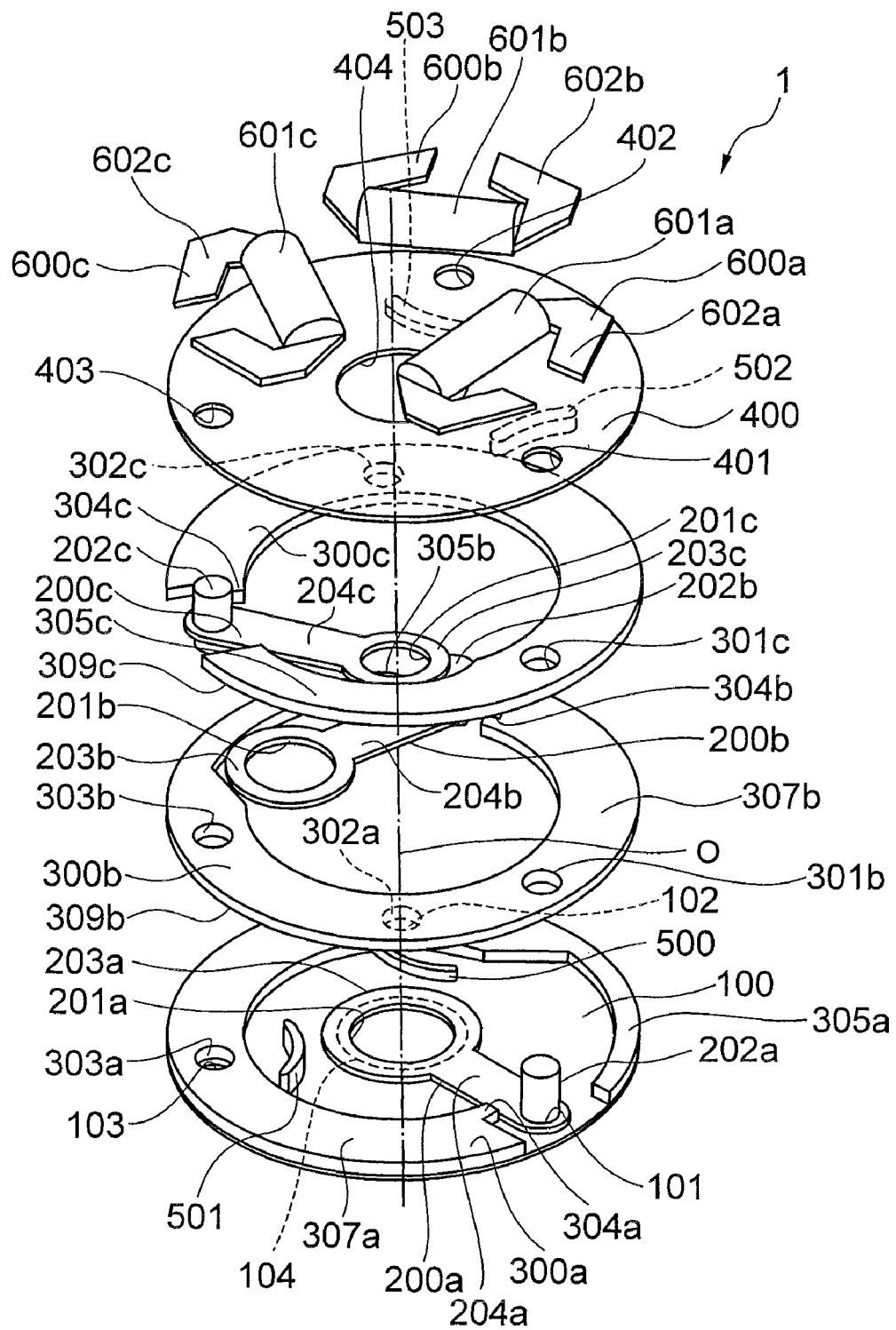
FIG. 1 is an exploded perspective view of the multi-step diaphragm apparatus according to a first embodiment.
Figure 2:
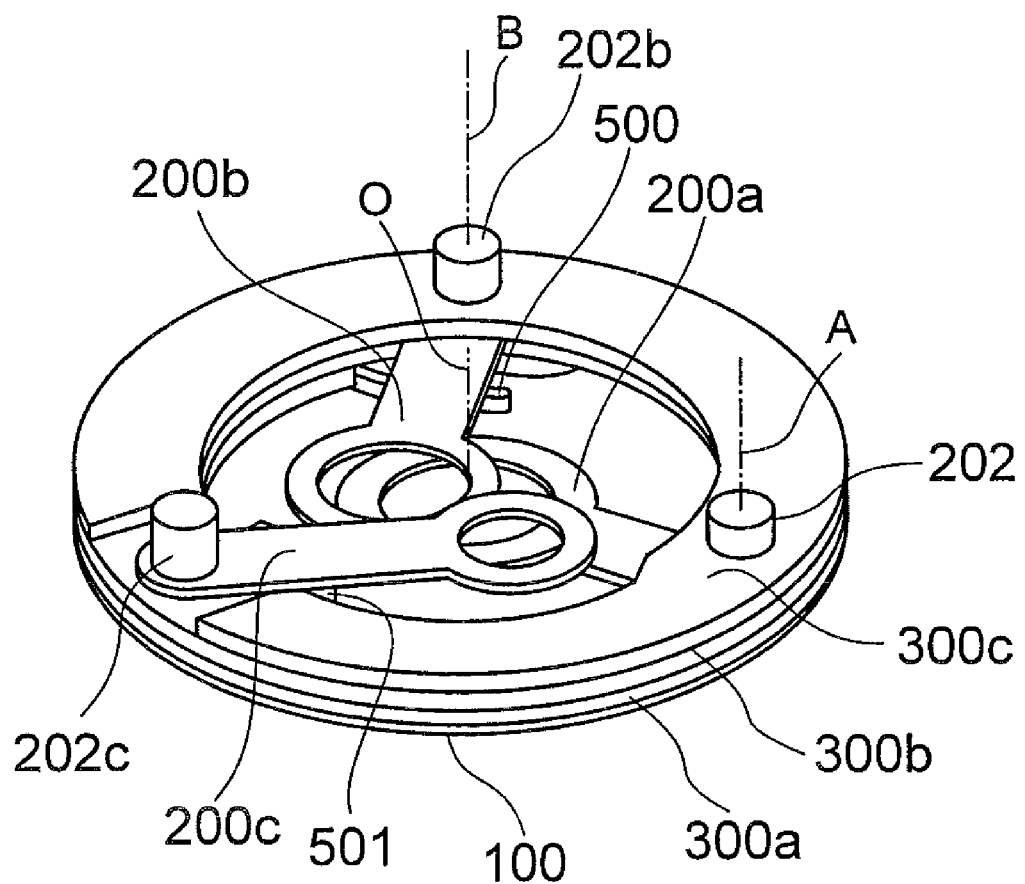
FIG. 2 is a perspective view of the multi-step diaphragm apparatus, where an upper substrate is not shown.
Figure 3:
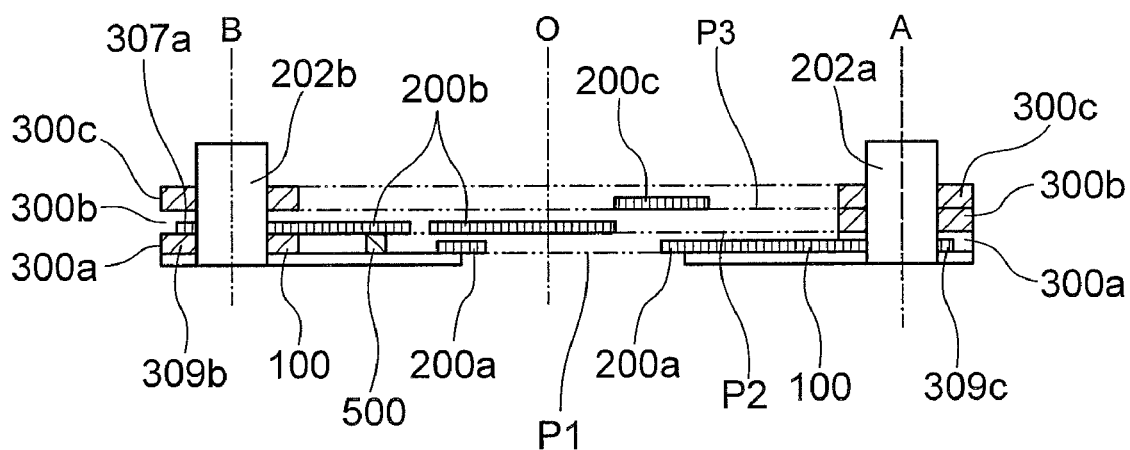
FIG. 3 is a cross sectional view of the multi-step diaphragm apparatus taken along a plane containing axes A, O, and B in FIG. 2.

In this embodiment, a description will be made, by way of example, of a light control apparatus in which a multi-step diaphragm apparatus is driven by an electromagnetic actuator. The multi-step diaphragm apparatus includes a plurality of diaphragm blades respectively having different aperture diameters, and the diaphragm blades are each moved between a position in the optical path and a position outside the optical path, whereby the quantity of light passing through the aperture can be regulated stepwise. The structure of a multi-step diaphragm apparatus 1 according to this embodiment will be described with reference to FIGS. 1, 2, and 3. FIG. 1 is an exploded perspective view of the multi-step diaphragm apparatus 1 according to this embodiment. FIG. 2 is a perspective view of the multi-step diaphragm apparatus, where an upper substrate is not shown. FIG. 3 is a cross sectional view of the multi-step diaphragm apparatus taken along a plane containing axes A, O, and B in FIG. 2.

As shown in FIG. 1, the multi-step diaphragm apparatus 1 according to the present embodiment is mainly composed of a lower substrate 100, a first diaphragm blade 200a, a first spacer 300a, a second diaphragm blade 200b, a second spacer 300b, a third diaphragm blade 200c, a third spacer 300c, an upper substrate 400, a first coil 600a, a second coil 600b, and a third coil 600c.

The lower substrate 100 has a first aperture 104 and a plurality of bearing holes 101, 102, 103, and rails 500, 501 having different heights are provided on the lower substrate 100. The first diaphragm blade 200a includes a light blocking portion 203a (light control portion) and an arm portion 204a. A second aperture 201a is provided in the light blocking portion 203a. A cylindrical magnet 202a is attached to the arm portion 204a. The first spacer 300a has bearing holes 302a, 303a and a positioning portion 304a. The second diaphragm blade 200b includes a light blocking portion 203b and an arm portion 204b. A third aperture 201b is provided in the light blocking portion 203b. A cylindrical magnet 202b is attached to the arm portion 204b. The second spacer 300b has bearing holes 301b, 303b and a positioning portion 304b.

The third diaphragm blade 200c includes a light blocking portion 203c and an arm portion 204c. A fourth aperture 201c is provided in the light blocking portion 203c. A cylindrical magnet 202c is attached to the arm portion 204c. The third spacer 300c has bearing holes 301c, 302c and a positioning portion 304c. The upper substrate 400 has a fifth aperture 404 and a plurality of bearing holes 401, 402, 403, and rails 502, 503 having different heights are provided on the upper substrate 400. The first coil 600a includes a core 602a and a coil wire 601a wound thereon, the second coil 600b includes a core 602b and a coil wire 601b wound thereon, and the third coil 600c includes a core 602c and a coil wire 601c wound thereon.

In the following, the components of the apparatus will be described in detail.

The lower substrate 100 and the upper substrate 400 are produced by machining (e.g. pressing) a thin plate made of a nonmagnetic material such as phosphor bronze, beryllium copper, or a resin. The lower substrate 100 and the upper substrate 400 respectively have apertures 104 and 404, bearing holes 101, 102, 103 and 401, 402, 403, rails 500, 501 and 502, 503 having different heights (i.e. lengths along the direction of the optical axis O). The height of the rail 500 is designed to be equal to the height of the upper surface 307b of the first spacer 300a shown in FIGS. 1 and 3. The height of the rail 501 is designed to equal to the height of the upper surface 307b of the second spacer 300b shown in FIGS. 1 and 3. The height of the rail 502 is designed to be equal to the height of the lower surface 309b of the second spacer 300b shown in FIGS. 1 and 3. The height of the rail 503 is designed to be equal to the height of the lower surface 309c of the third spacer 300c shown in FIGS. 1 and 3. The centers of the apertures 104 and 404 are located on an optical axis O. The apertures 104 and 404 provide an optical path through which incident light passes. The apertures 104 and 404 have the same or different diameters, and the diameter of these apertures (or the smaller aperture, in cases where these apertures have different diameters) determines the maximum aperture diameter of the multi-step diaphragm apparatus 1.

The spacers 300a, 300b, 300c are used to define the distances between the lower substrate 100, the upper substrate 400, and the spacers. The spacers 300a, 300b, 300c are produced by machining (e.g. pressing) a thin plate made of a nonmagnetic material as with the lower substrate 100 and the upper substrate 400.

As with the lower substrate 100 and the upper substrate 400, the first diaphragm blade 200a is produced by machining (e.g. pressing) a thin plate made of a nonmagnetic material and having a thickness smaller than that of the first spacer 300a. The light blocking portion 203a is provided with the aperture 201a having a diameter smaller than that of the apertures 104 and 404 provided on the lower substrate 100 and the upper substrate 400.

The cylindrical magnet or shaft member 202a is attached to the arm portion 204a by press fitting or the like. The shaft member 202a is rotatably fitted in the bearing hole 101 provided on the lower substrate 100, the bearing hole 401 provided on the upper substrate 400, the bearing hole 301b provided on the second spacer 300b, and the bearing hole 301c provided on the third spacer 300c. The first diaphragm blade 200a is adapted to be able to swing about the shaft member 202a serving as the rotary shaft having a rotation axis A. The movable space of the first diaphragm blade 200a is restricted by the lower substrate 100, the second spacer 300b, and the rail 502 provided on the upper substrate 400 with respect to the direction of the optical axis O, and by the positioning portion 304a provided on one end of the first spacer 300a and the other end 305a of the first spacer 300a with respect to the direction of swinging. The positioning portion 304a is designed in such a way that the center of the aperture 201a is located on the optical axis O when the first diaphragm blade 200a abuts the positioning portion 304a.

As with the lower substrate 100 and the upper substrate 400, the second diaphragm blade 200b is produced by machining (e.g. pressing) a thin plate made of a nonmagnetic material and having a thickness smaller than that of the second spacer 300b. The light blocking portion 203b is provided with the aperture 201b having a diameter smaller than that of the aperture 201a provided on the first diaphragm blade 200a. The cylindrical magnet or shaft member 202b is attached to the arm portion 204b by press fitting or the like.

The shaft member 202b is rotatably fitted in the bearing hole 102 provided on the lower substrate 100, the bearing hole 402 provided on the upper substrate 400, the bearing hole 302a provided on the first spacer 300a, and the bearing hole 302c provided on the third spacer 300c. The second diaphragm blade 200b is adapted to be able to swing about the shaft member 202b serving as the rotary shaft having a rotation axis B. The movable space of the second diaphragm blade 200b is restricted by the first spacer 300a, the rail 500 provided on the lower substrate 100, the third spacer 300c, and the rail 503 provided on the upper substrate 400 with respect to the direction of the optical axis O, and by the positioning portion 304b provided on one end of the second spacer 300b and the other end 305b of the second spacer 300b with respect to the direction of swinging. The positioning portion 304b is designed in such a way that the center of the aperture 201b is located on the optical axis O when the second diaphragm blade 200b abuts the positioning portion 304b.

As with the lower substrate 100 and the upper substrate 400, the third diaphragm blade 200c is produced by machining (e.g. pressing) a thin plate made of a nonmagnetic material and having a thickness smaller than that of the third spacer 300c. The light blocking portion 203c is provided with the aperture 201c having a diameter smaller than that of the aperture 201b provided on the second diaphragm blade 200b. The cylindrical magnet or shaft member 202c is attached to the arm portion 204c by press fitting or the like. The shaft member 202c is rotatably fitted in the bearing hole 103 provided on the lower substrate 100, the bearing hole 403 provided on the upper substrate 400, the bearing hole 303a provided on first spacer 300a, and the bearing hole 303b provided on the second spacer 300b. The third diaphragm blade 200c is adapted to be able to swing about the shaft member 202c serving as the rotary shaft.

The movable space of the third diaphragm blade 200c is restricted by the upper substrate 400, the second spacer 300b, and the rail 501 provided on the lower substrate 100 with respect to the direction of the optical axis O, and by the positioning portion 304c provided on one end of the third spacer 300c and the other end 305c of the third spacer 300c with respect to the direction of swinging. The third diaphragm blade 200c is designed in such a way that the center of the aperture 201c is located on the optical axis O when the third diaphragm blade 200c abuts the positioning portion 304c.

The first coil 600a includes a core 602a made of ferromagnetic material such as silicon steel or permalloy and a coil wire 601a wound thereon. The configurations of the second coil 600b and third coil 600c are the same as that of the first coil 600a.

Figure 4:
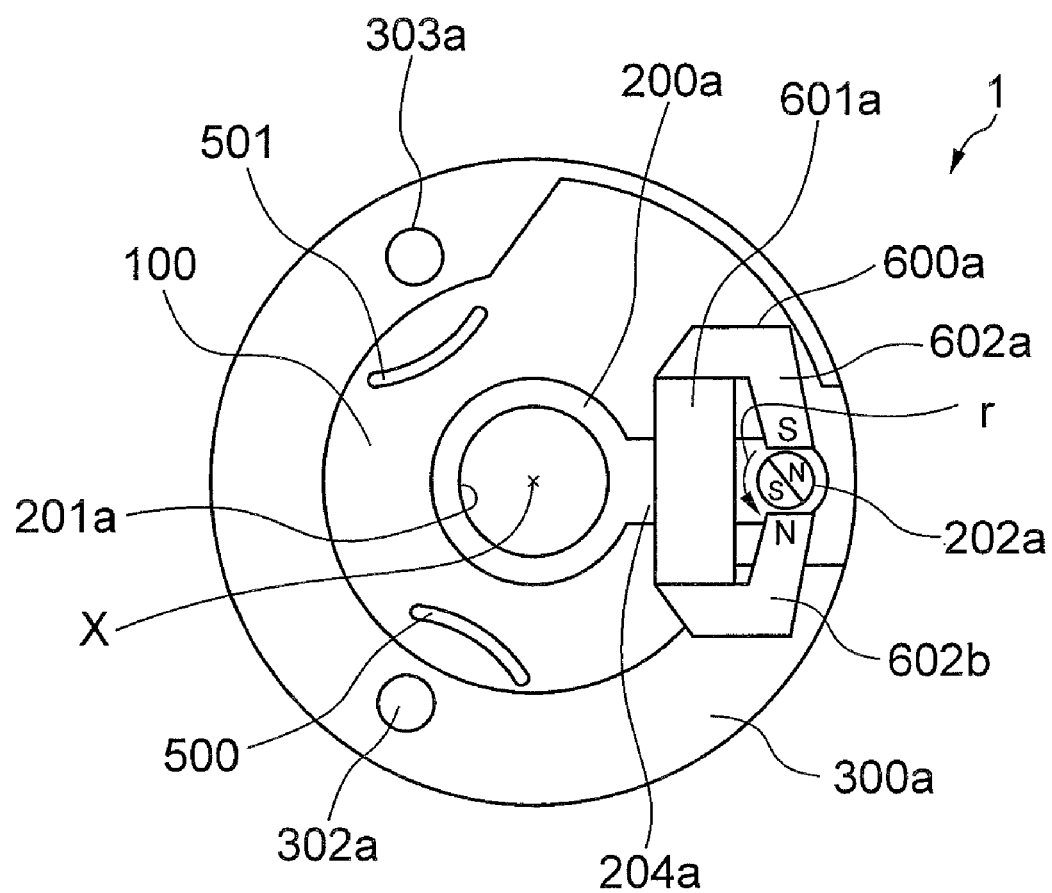
FIG. 4 is a top view showing the configuration of a lower substrate, a first diaphragm blade, a first spacer, and a first coil in the multi-step diaphragm apparatus according to the first embodiment in the state in which the first diaphragm blade is located at an aperture position.
Figure 5:
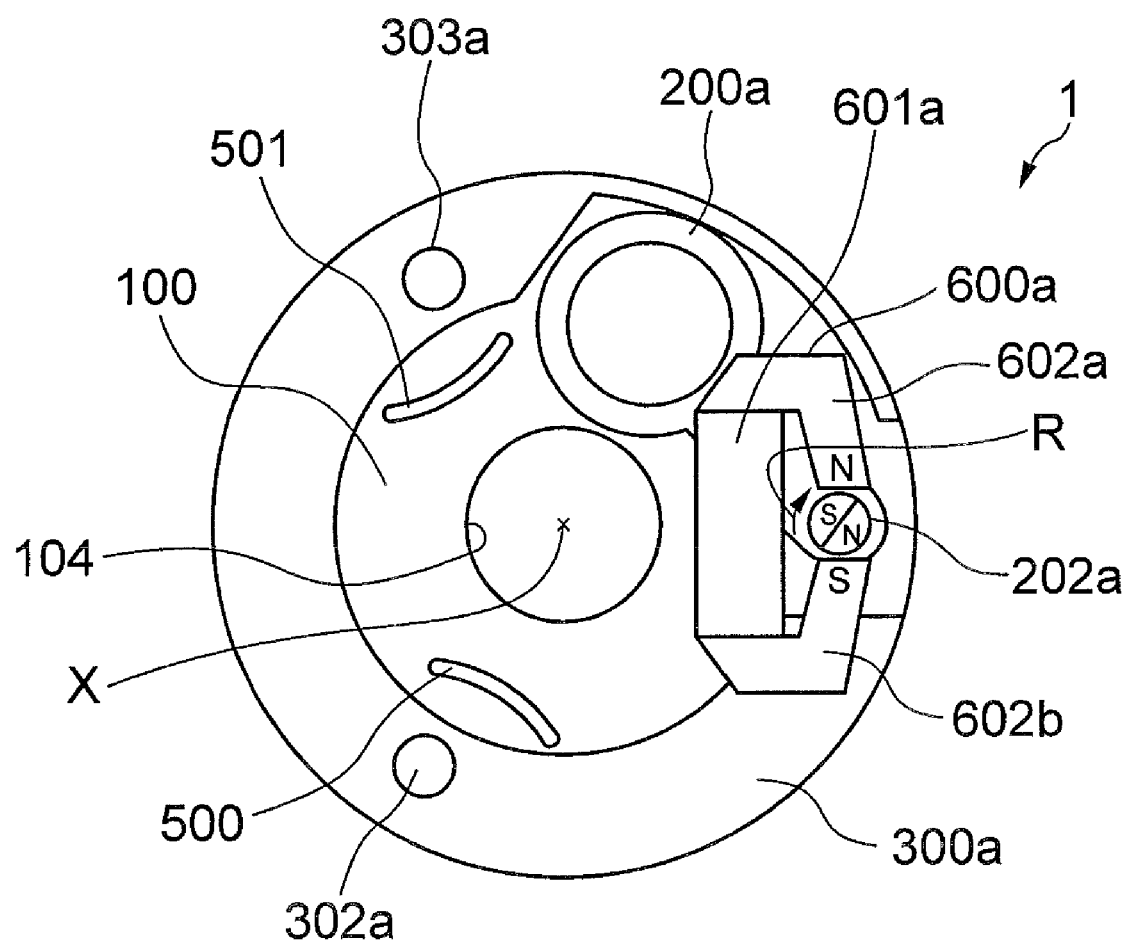
FIG. 5 is a top view showing the configuration of the lower substrate, the first diaphragm blade, the first spacer, and the first coil in the multi-step diaphragm apparatus according to the first embodiment in the state in which the first diaphragm blade is located at a retracted position.
Figure 6:
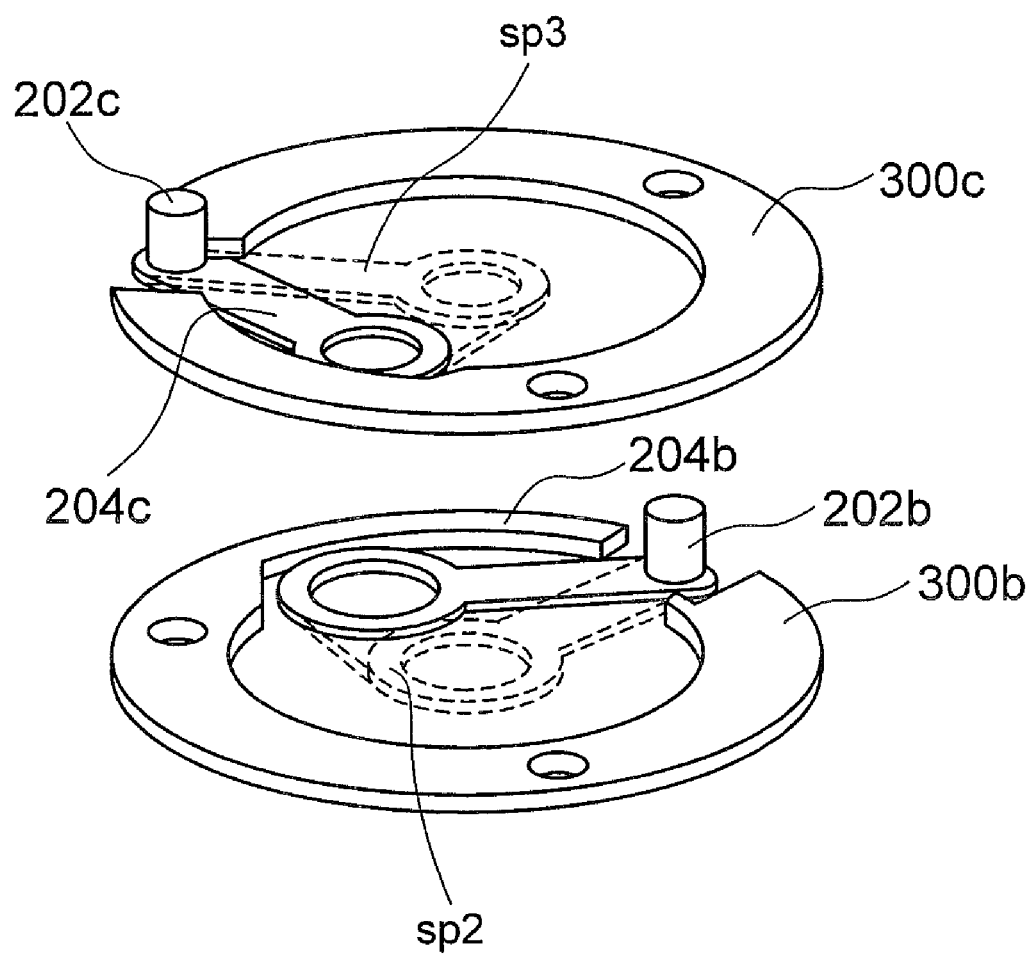
FIG. 6 is a diagram for illustrating the moving spaces of the diaphragm blades, in which the second diaphragm blade and the third diaphragm blade are shown in perspective.

Next, the operation of the multi-step diaphragm apparatus 1 in this embodiment will be described with reference to FIGS. 4, 5, and 6. FIGS. 4 and 5 are top views showing the structure of the lower substrate 100, the first diaphragm blade 200a, the first spacer 300a, and the first coil 600a of the multi-step diaphragm apparatus 1 according to this embodiment. FIG. 4 shows the state in which the first diaphragm blade 200a has been inserted (moved) to the position of the first aperture 104 provided on the lower substrate 100. (This position will be hereinafter referred to as the aperture position). FIG. 5 shows the state in which the first diaphragm blade 200a is kept away from the first aperture 104 provided on the lower substrate 100 (hereinafter, this position will be referred to as the retracted position). FIG. 6 is a diagram for illustrating the moving spaces of the diaphragm blades, in which the second diaphragm blade 200b and the third diaphragm blade 200c are shown in perspective.

As shown in FIGS. 4 and 5, the shaft member 202a is made of a cylindrical magnet, which is magnetized in such a way that the N pole and the S pole are opposed to each other along the diametrical direction. As shown in FIGS. 4 and 5, the first coil 600a includes the core 602a and the coil wire 601a wound thereon. Arm portions 602a and 602b of the first coil 600a are magnetized to be the N pole and the S pole alternately with supply of current to the coil wire 601a.

The arm portions 602a and 602b of the first coil 600a are configured in such a way that the shaft member 202a attached to the first diaphragm blade 200a is located between them. Magnetic attractive and repulsive forces acting between the magnetic field induced by the first coil 600a and the magnetic field of the shaft member 202a produce a torque in the shaft member 202a to cause the diaphragm blade 200a to swing about the shaft member 202a serving as the pivot. The direction of rotation or swinging can be controlled by changing the direction of the current applied to the coil wire 601a.

When, as shown in FIG. 4, a magnetic field is generated by the first coil 600a, a counterclockwise torque (in the direction indicated by arrow r in FIG. 4) acts on the first diaphragm blade 200a, and the first diaphragm blade 200a abuts the positioning portion 304a of the first spacer 300a (see FIG. 1). In this state, the light blocking portion 203a of the first diaphragm blade 200a covers the first aperture 104 provided on the lower substrate 100, and the center of the second aperture 201a provided on the light blocking portion 203a of the first diaphragm blade 200a aligns with the optical axis O. Thus, the diameter of the optical path through which incident light passes is equal to the diameter of the second aperture 201a.

When, as shown in FIG. 5, a magnetic field is generated by the first coil 600a, a clockwise torque (in the direction indicated by arrow R in FIG. 5) acts on the first diaphragm blade 200a, and the first diaphragm blade 200a abuts the other end 305a of the first spacer 300a (see FIG. 1). In this state, the light blocking portion 203a of the first diaphragm blade 200a is kept away from the first aperture 104 provided on the lower substrate 100. Thus, the diameter of the optical path through which incident light passes is equal to the diameter of the first aperture 104.

Similarly, the second diaphragm blade 200b or the third diaphragm blade 200c can be inserted (moved) to the position of the first aperture 104 provided on the lower substrate 100 to make the diameter of the optical path through which incident light passes equal to the diameter of the aperture 201b provided on the second diaphragm blade 200b or the diameter of the aperture 201c provided on the third diaphragm blade 200c (see FIG. 1). Thus, the diameter of the aperture of the apparatus can be controlled in four-steps in total.

Next, the advantageous effects of the multi-step diaphragm apparatus 1 according to this embodiment will be described.

As described above, the multi-step diaphragm apparatus 1 according to this embodiment has the lower substrate 100, the upper substrate 400, the first spacer 300a, the second spacer 300b, the third spacer 300c, and the rails 500, 501, 502, 503. Therefore, the diaphragm blades are respectively moved in different planes that are perpendicular to the optical axis O (e.g. the planes in which the first diaphragm blade 200a, the second diaphragm blade 200b and the third diaphragm blade 200c are moved are referred to as P1, P2, and P3, respectively as shown in FIG. 3). Consequently, the space for movement of the first diaphragm blade 200a, the space sp2 for movement of the second diaphragm blade 200b, and the space sp3 for movement of the third diaphragm blade 200c can be designed in such a way as not to abut each other (or as to be separated from each other by certain gaps). Thus, interference of the diaphragm blades with each other can be prevented, whereby the diaphragm blades can be driven reliably without being affected by the swinging of the other diaphragm blades. Furthermore, the frictional force generated during the driving of the diaphragm blades can be reduced, whereby a high speed driving of the diaphragm blades, a reduction of electric power consumption, and a size reduction of the apparatus can be achieved.

If the diaphragm blades in this embodiment are replaced by a plurality of optical lenses, the apparatus can serve as an optical lens interchanging apparatus. Alternatively, if the diaphragm blades in this embodiment are replaced by a plurality of optical filters, the apparatus can serve as an optical filter interchanging apparatus that changes the quantity of transmitted light or the transmitted wavelength range.

(Second Embodiment)

Figure 7:
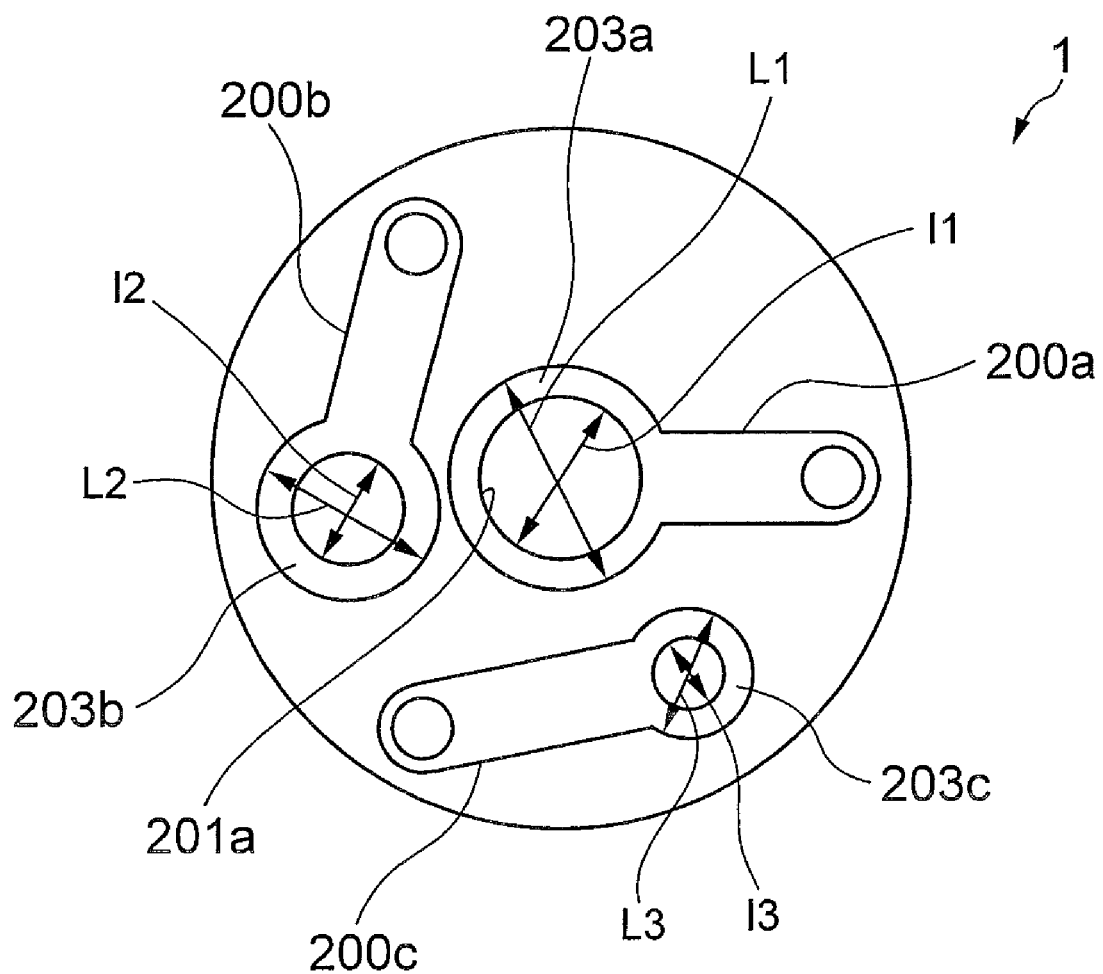
FIG. 7 is a top view showing the configuration of diaphragm blades in a multi-step diaphragm apparatus according to a second embodiment in the state in which a first diaphragm blade is located at the aperture position, and second and third diaphragm blades are located at retracted positions.
Figure 8:
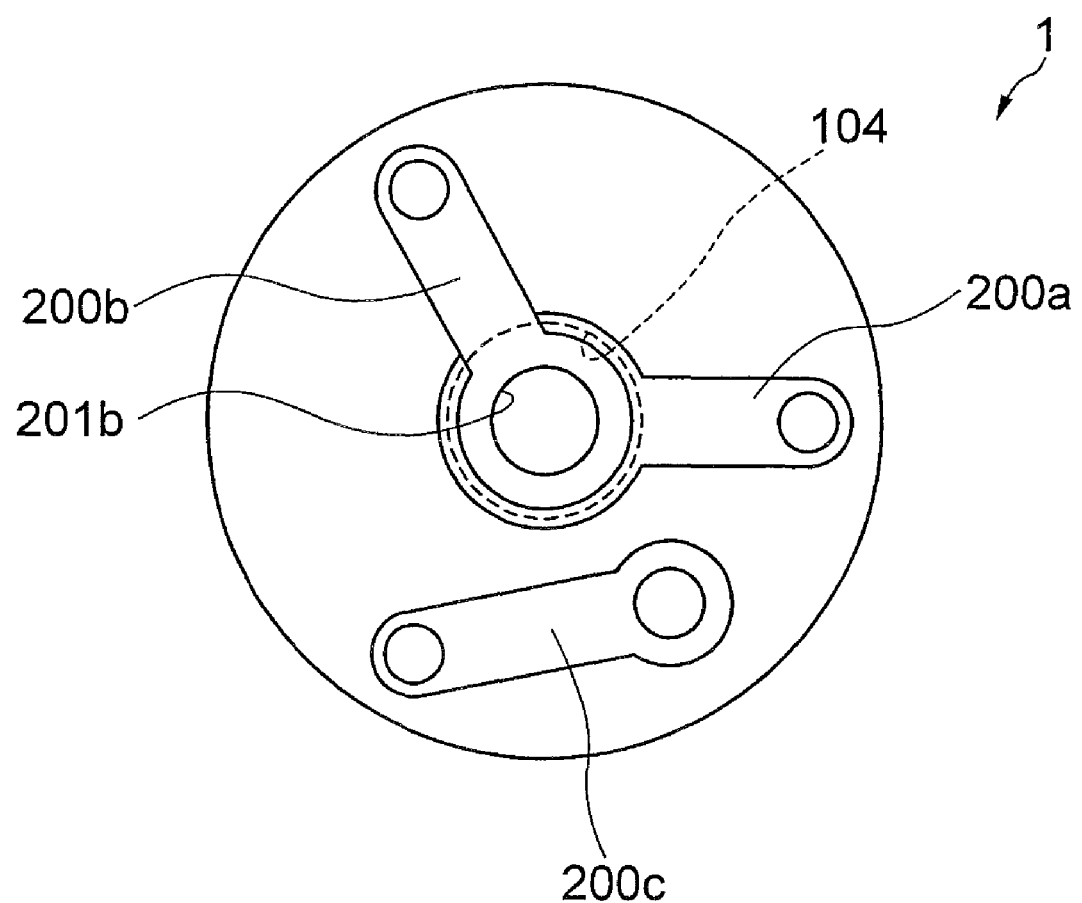
FIG. 8 is a top view showing the configuration of the diaphragm blades in the multi-step diaphragm apparatus according to the second embodiment in the state in which the first and second diaphragm blades are located at the aperture position, and the third diaphragm blade is located at the retracted position.
Figure 9:
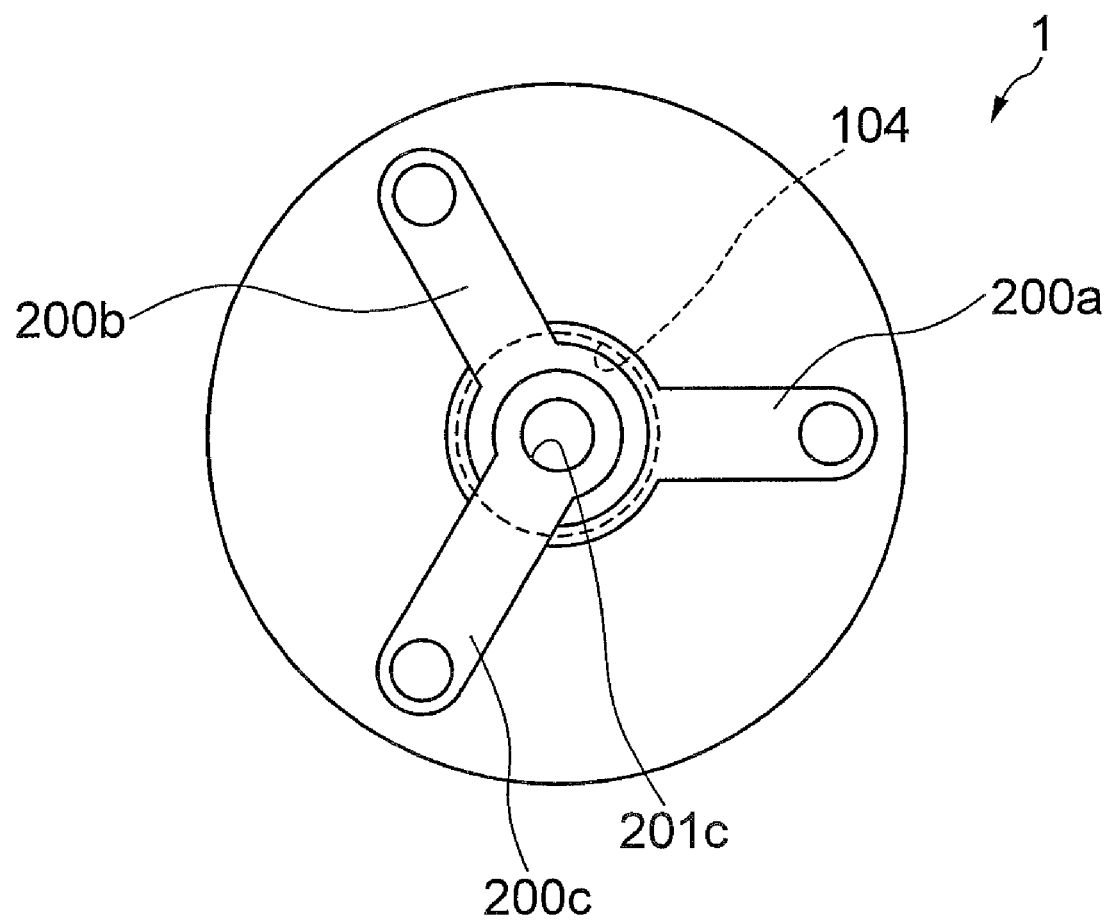
FIG. 9 is a top view showing the configuration of the diaphragm blades in the multi-step diaphragm apparatus according to the second embodiment in the state in which the first, second, and third diaphragm blades are located at the aperture position.

A multi-step diaphragm apparatus 1 according to a second embodiment will be described with reference to FIGS. 7, 8, and 9. FIGS. 7 and 8 are top views showing the configuration of the diaphragm blades of the multi-step diaphragm apparatus 1 according to the second embodiment. FIG. 7 shows the state in which the first diaphragm blade 200a is located at the aperture position and the second diaphragm blade 200b and the third diaphragm blade 200c are located at the retracted positions, FIG. 8 shows the state in which the first diaphragm blade 200a and the second diaphragm blade 200b are located at the aperture position and the third diaphragm blade 200c is located at the retracted position, and FIG. 9 shows the state in which the first diaphragm blade 200a, the second diaphragm blade 200b and the third diaphragm blade 200c are located at the aperture position.

The dimensions of the diaphragm blades will be described with reference to FIG. 7. Here, in the diaphragm blades shown in FIG. 7, the diameters of the light blocking portion 203a and the aperture 201a of the first diaphragm blade 200a are represented by L1 and l1 respectively, the diameters of the light blocking portion 203b and the aperture 201b of the second diaphragm blade 200b are represented by L2 and l2 respectively, and the diameters of the light blocking portion 203c and the aperture 201c of the third diaphragm blade 200c are represented by L3 and l3 respectively. The diaphragm blades are designed in such a way that the diameters of the light blocking portions and the diameters of the apertures satisfy the following conditions:

l1>l2>l3, and

L1>L2>L3.

Next, the operation of the multi-step diaphragm apparatus 1 according to this embodiment will be described with reference to FIGS. 7, 8, and 9. In the state shown in FIG. 7, the diameter of the optical path through which incident light passes is equal to the diameter of the second aperture 201a. In the state shown in FIG. 8, the diameter of the optical path through which incident light passes is equal to the diameter of the third aperture 201b. In the state shown in FIG. 9, the diameter of the optical path through which incident light passes is equal to the diameter of the fourth aperture 201c.

In this way, in the multi-step diaphragm apparatus 1 according to this embodiment, the aperture is defined by setting two or three diaphragm blades, in combination, to the aperture position (namely using a plurality of diaphragm blades in cooperation).

Next, advantageous effects of the multi-step diaphragm apparatus 1 according to this embodiment will be described. As described above, the diaphragm blades 200a, 200b, and 200c of the multi-step diaphragm apparatus 1 according to this embodiment may be designed in such a way that the diameters of the respective light blocking portions 203a, 203b, and 200c are decremented in order, whereby the moving spaces necessary for retracting the diaphragm blades from the aperture 104 can be reduced, and a size reduction of the apparatus can be achieved.

(Third Embodiment)

A multi-step diaphragm apparatus 1 according to a third embodiment will be described with reference to FIG. 10.

Figure 10:
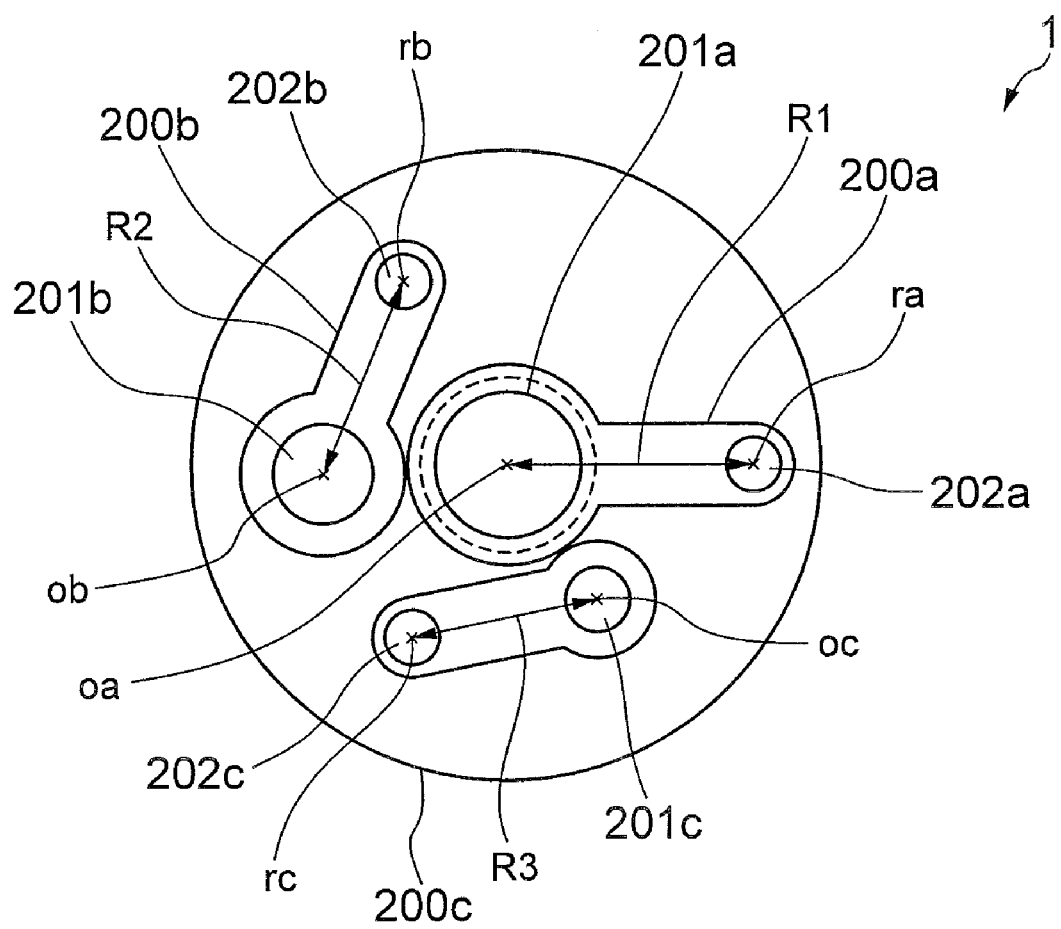
FIG. 10 is a top view showing the configuration of diaphragm blades in a multi-step diaphragm apparatus according to a third embodiment.

FIG. 10 is a top view showing the structure of the multi-step diaphragm apparatus 1 according to the third embodiment. Here, in the diaphragm blades shown in FIG. 10, the distance between the center oa of the aperture 201a of the first diaphragm blade 200a and the rotation center ra of the shaft member 202a is represented by R1, the distance between the center ob of the aperture 201b of the second diaphragm blade 200b and the rotation center rb of the shaft member 202b is represented by R2, and the distance between the center oc of the aperture 201c of the third diaphragm blade 200c and the rotation center rc of the shaft member 202c is represented by R3. The diaphragm blades are designed in such a way that the aforementioned distances R1, R2 and R3 satisfy the following condition:

$$R1>R2>R3.$$

The operation of the diaphragm blades 200a, 200b, and 200c is the same as that in the second embodiment.

Next, advantageous effects of the multi-step diaphragm apparatus 1 according to this embodiment will be described.

As described above, the diaphragm blades 200a, 200b, and 200c of the multi-step diaphragm apparatus 1 according to this embodiment may be designed in such a way that the lengths of the diaphragm blades 200a, 200b, and 200c along their longitudinal directions are decremented in that order, whereby the moving spaces of the diaphragm blades can be reduced, and a size reduction of the apparatus can be achieved.

(Fourth Embodiment)

Figure 11:
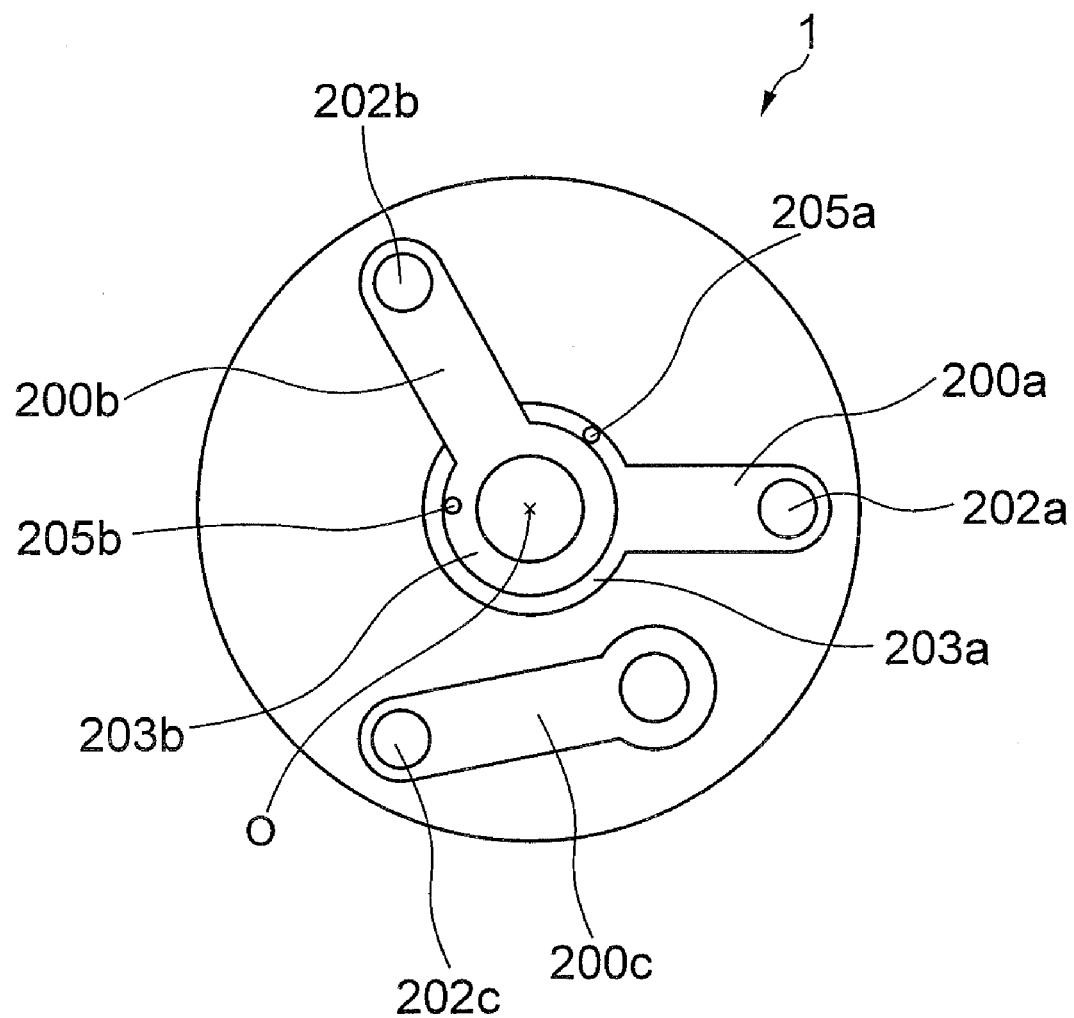
FIG. 11 is a top view showing the configuration of diaphragm blades in a multi-step diaphragm apparatus according to a fourth embodiment.

A multi-step diaphragm apparatus 1 according to a fourth embodiment will be described with reference to FIG. 11. FIG. 11 is a top view showing the structure of the diaphragm blades 200a, 200b, 200c of the multi-step diaphragm apparatus 1 according to the fourth embodiment.

As shown in FIG. 11, positioning projections 205a and 205b are provided on the light blocking portion 203a of the first diaphragm blade 200a and the light blocking portion 203b of the second diaphragm blade 200b respectively. Therefore, the second spacer and the third spacer (which are not shown in FIG. 11) in the multi-step diaphragm apparatus 1 according to this embodiment need not be provided with positioning portions like the positioning portion 304b provided on the second spacer 300b and the positioning portion 304c provided on the third spacer 300c in the first to third embodiments (see FIG. 1).

Next, the operation of the multi-step diaphragm apparatus 1 according to this embodiment will be described with reference to FIG. 11. As shown in FIG. 11, when the second diaphragm blade 200b is moved to the aperture position, the second diaphragm blade 200b is positioned by abutting the positioning projection 205a provided on the first diaphragm blade 200a. Similarly, when the third diaphragm blade 200c is moved to the aperture position, the third diaphragm blade 200c is positioned by abutting the positioning projection 205b provided on the second diaphragm blade 200b.

Next, advantageous effects of the multi-step diaphragm apparatus 1 according to this embodiment will be described.

In the multi-step diaphragm apparatus 1 according to the fourth embodiment, since at least two diaphragm blades 200b and 200c other than the first diaphragm blade 200a directly abut the positioning projections at the location at which they are to be positioned (i.e. at the aperture position), the amount of positional error is determined by the sum total of manufacturing errors of these members. Thus, the resultant positional error at the aperture position can be made smaller than that in the above described first to third embodiments.

Although the light control apparatuses according to the first to fourth embodiments are provided with a multi-step diaphragm apparatus having three diaphragm blades, the light control apparatus according to the present invention is not limited to this configuration and the number of the diaphragm blades may be changed fitly, as will be readily understood.

The present invention can suitably applied to a light control apparatus, particularly to a light control apparatus having high operational performance.

The light control apparatus according to the present invention are advantageous in that high operational performance can be achieved, because it has the spacers that separate the spaces respectively for in-plane movements of a plurality of incident light control members by certain gaps.

What is claimed is:

1. A light control apparatus for controlling incident light passing through an aperture comprising:
   a substrate having the aperture;
   a plurality of incident light control members that are moved respectively in different planes perpendicular to an optical axis direction on the substrate;
   a plurality of drive members that drive the incident light control members; and
   separating members that separate, with a certain gap, moving spaces in which the plurality of incident light control members moves in the respective planes, wherein
   the plurality of incident light control members are each moved by the drive members between an aperture position and a retracted position away from the aperture position.

2. A light control apparatus according to claim 1, wherein a thickness of the separating member along the optical axis direction is larger than a thickness of the incident light control members along the optical axis direction.

3. A light control apparatus according to claim 1 or 2, wherein the separating member for one of the incident light control members comprises a first separating member and a second separating member.

4. A light control apparatus according to claim 3, wherein the second separating member has a rail-like shape and is provided on the substrate.

5. A light control apparatus according to claim 4, further comprising a second substrate opposed to the substrate, wherein the second separating member having a rail-like shape is provided on each of the substrate and the second substrate.

6. A light control apparatus according to claim 1, wherein each of the light control members comprises a light control portion and an arm portion,
   the arm portion has a rotary shaft, and
   the light control portion is swung about the rotary shaft to move between the aperture position and the retracted position away from the aperture position.

7. A light control apparatus according to claim 1, wherein the light control portions of the incident light control members have apertures having different sizes respectively and regulate the quantity of incident light passing through the apertures.

8. A light control apparatus according to claim 7, wherein the apparatus satisfies the following conditions:

$$l1>l2>\ldots>ln, \text{ and}$$

$$L1>L2>\ldots>Ln,$$

where n is the number of the incident light control members, L1 to Ln are diameters of the light control portions of the first to n-th incident light control members respectively, and l1 to ln are diameters of the apertures of the light control portions of the first to n-th incident light control members respectively.

9. A light control apparatus according to claim 8, wherein the first to (n−1)-th incident light control members move from the retracted position to the aperture position synchronously, in response to a movement of the n-th incident light control member from the retracted position to the aperture position.

10. A light control apparatus according to claim 9, wherein positioning portions are provided on the incident light control members, and when the n-th incident light control member is moved to the aperture position, the n-th incident light control member abuts the positioning portion provided on the (n−1)-th incident light control member, whereby positioning of the n-th incident light control member is achieved.

11. A light control apparatus according to claim 6, wherein distances between the rotary shafts provided on the respective incident light control members and the optical axis are substantially equal to each other.

12. A light control apparatus according to claim 6, wherein distances between the rotary shafts provided on the respective incident light control members and the optical axis are different from each other.

13. A light control apparatus according to claim 12, wherein the apparatus satisfies the following condition:

$$R1 > R2 > \ldots Rn,$$

where R1 to Rn are distances between the center of the aperture and the rotary shaft of the first to n-th incident light control members respectively.

\* \* \* \* \*